May 7, 1968

W. ENGELMANN 3,381,732

LOCKNUT

Original Filed Dec. 4, 1962

INVENTOR
Walter Engelmann

BY: Dicke & Craig
ATTORNEYS

May 7, 1968   W. ENGELMANN   3,381,732
LOCKNUT
Original Filed Dec. 4, 1962   4 Sheets-Sheet 2
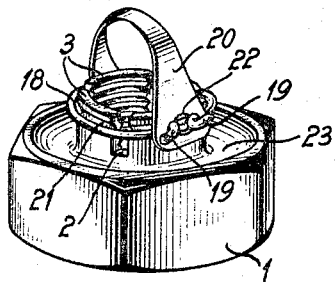
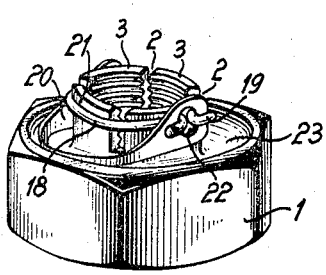
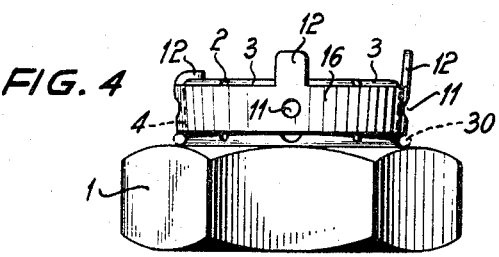
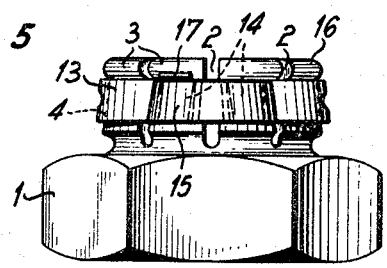
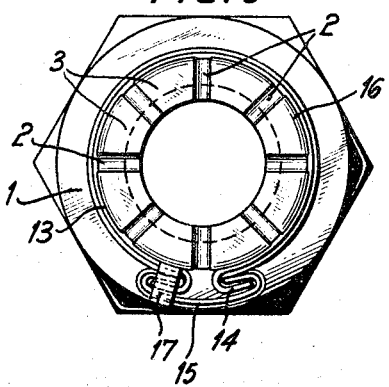
INVENTOR
WALTER ENGELMANN
BY: *Dicke & Craig*
ATTORNEYS May 7, 1968 W. ENGELMANN 3,381,732
LOCKNUT
Original Filed Dec. 4, 1962 4 Sheets-Sheet 3

INVENTOR
Walter Engelmann
By: Dicke & Craig
ATTORNEYS

May 7, 1968 W. ENGELMANN 3,381,732

LOCKNUT

Original Filed Dec. 4, 1962

INVENTOR
Walter Engelmann

BY Dicke & Craig
ATTORNEYS

United States Patent Office 3,381,732
Patented May 7, 1968

3,381,732
LOCKNUT
Walter Engelmann, Weingartenstrasse 35,
Eislingen (Fils), Germany
Original application Dec. 4, 1962, Ser. No. 242,291.
Divided and this application Apr. 13, 1966, Ser.
No. 542,305
Claims priority, application Germany, Dec. 6, 1961,
E 22,076; Austria, Apr. 17, 1962, A 3,175/62
10 Claims. (Cl. 151—19)

ABSTRACT OF THE DISCLOSURE

A locknut which consists of a nut body with a neck portion of smaller diameter and having an internal screw thread extending continuously through the body and the neck portion while the neck portion has a smooth, conical outer surface tapering toward the body and includes radial slots dividing the same into a plurality of arcuate radially resilient segments; a closed clamping ring with a complementary smooth conical inner surface tapering similar to the conical outer surface of the neck portion which is shorter than the neck portion in the axial direction and is displaced from the non-clamping position into the clamping position by axial movement away from the nut body so that an annular gap is formed between adjacent surfaces of the nut body and the clamping ring which increases in its axial dimension when the clamping ring is in the clamping position; an annular securing element at least partially embracing the neck portion is inserted into the gap to retain the clamping ring in the clamping position whereby the annular securing element is of such a dimension in the axial direction as to be insertable into the gap only when the clamping ring is in the clamping position which is brought about also by the use of a material for the annular securing element which possesses substantial rigidity against changes in the cross-sectional dimension corresponding to the axial direction in order to be capable of producing a counter force sufficient to retain the clamping ring in the clamped position.

The present application is a divisional application of Ser. No. 242,291, filed on Dec. 4, 1962.

The present invention relates to improvements in locknuts.

There are already locknuts known of the type in which the nut body has an upper neck portion of a smaller diameter which is divided by several radial slots into arcuate resilient segments which may be pressed together by a rotatable counterpart, whereby the locknut is clamped on the bolt, threaded pipe, or the like. This rotatable counterpart may be either a resilient spring ring or a non-resilient threaded ring. A serious disadvantage of such a locknut is the fact that by the rotation of this counterpart after the locknut has been tightened the locknut may be further tightened or loosened. In some of these prior locknut constructions, the segments are also not pressed uniformly together around their entire circumference. Furthermore, since the counterpart starts to press the screw threads of the segments into the screw thread of the bolt as soon as the nut is being screwed on the latter, an additional friction is produced which increases the more the nut is being tightened on the bolt. It may therefore occur that the locknut might not be tightened sufficiently simply because the segments are already strongly tightened.

It is an object of the invention to provide a locknut which like the locknuts as above described also has an upper neck portion of a smaller diameter which is divided by radial slots into arcuate, resiliently compressible segments, but which overcomes the above-mentioned disadvantages of the prior locknuts by the provision of a clamping element which is tightened after the nut is properly tightened on the bolt or the like, and which compresses and tightens the segments uniformly around their entire circumference in radial directions although no rotary motion is exerted upon and by this clamping element and therefore also no torque is exerted thereby upon the segments and thus no additional friction upon the locknut itself.

The locking element according to the invention may be of many different designs and may consist, for example, of a closed clamping ring with a conical inner surface which compresses the resilient segments when being shifted in the axial direction of the nut along the outer conical surface of the segments, the diameter of which increases toward the outer end thereof. In place of such a clamping ring it is also possible to employ a clamping strap of sheet metal which is closed like a ring or open on one side. In the latter case, the ends of the ring-like strap may be drawn together by a wedge-shaped slide member or by a clamp in the form of a stirrup. hTe clamping element may also consist of a simple clamping wire which is placed around the resilient segments and the ends of which are twisted together to tighten the wire and thus the segments, or it may consist of an open ring which may be tightened around the segments by a bracket which connects the two ends of the ring and is, in turn, tightened by a lever.

For radially compressing the segments, the clamping element is therefore either shifted in the axial direction of the locknut or its circumference is reduced around the segments.

The various features and advantages of the present invention as outlined above will become more clearly apparent from the following detailed description thereof which is to be read with reference to the accompanying drawings, in which:

FIGURE 4 shows a side view of a locknut with an annular clamping strap;

FIGURE 5 shows a side view of a locknut with a clamping strap and a wedge-shaped slide member;

FIGURE 6 shows a plan view of the locknut according to FIGURE 5;

FIGURE 7 shows a perspective view of a locknut with a clamping stirrup in the released position;

FIGURE 8 shows a perspective view of the locknut according to FIGURE 7 in the tightened position;

FIGURE 15 shows a plan view of a pair of pliers for tightening the clamping element of a locknut according to FIGURE 1; while

Figure 1:
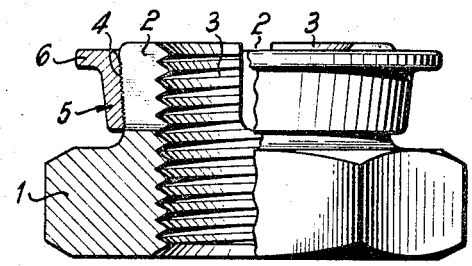
FIGURE 1 shows an enlarged side view, partly in section, of a locknut according to the invention with a conical locking ring.

As illustrated in the drawings, the locknut according to the invention consists of the usual nut body 1 which is provided with a neck-like flange of a smaller diameter which is divided by several radial slots 2 into arcuate, resiliently compressible segments 3. The screw thread of the nut extends continuously through the nut body 1 and the segments 3. The locknut may be tightened on a bolt, not shown, and loosened therefrom in the usual manner. In order to lock the nut securely on the bolt after being tightened thereon, segments 3 will be uniformly compressed in radian directions by a clamping element which acts upon the entire circumference of the segments. This compression does not affect the position of the nut or exert a torque thereon.

Figure 2:
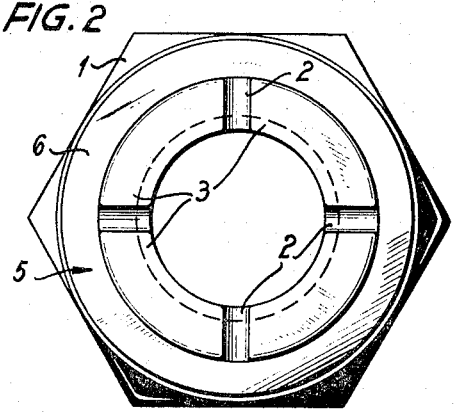
FIGURE 2 shows a plan view of the locknut according to FIGURE 1.

According to a first embodiment of the invention, as illustrated in FIGURES 1 and 2, the clamping element consists of a closed clamping ring 5 which is conical on the inside and is fitted over the segments 3 on nut 1, the peripheral outer surface of which is likewise conical, increasing in diameter from the inner to the outer end thereof. Since the segments 3 are resiliently compressible, the clamping ring 5 may be fitted over them without difficulty. Thereafter, clamping ring 5 rests loosely on the nut body 1 without pressing upon the segments 3. Clamping ring 5 may, however, also be of such an inner diameter that, as soon as it is slipped over the segments 3 the segments will be under a slight initial tension which is of advantage in the event that the clamping ring 5 should ever break since in such a case the nut, although not firmly clamped on the bolt, will remain securely tightened thereon at least under ordinary circumstances.

If clamping ring 5 is shifted in the axial direction of nut 1 toward the outside, the conical inner surface thereof engages with the outer conical surfaces 4 of segments 3 and compresses the latter in radial directions. In order to facilitate the axial displacement of clamping ring 5, it is advisable to provide the latter with an outwardly projecting flange 6. The operation of shifting the clamping ring toward the outside may be carried out by means of any suitable tool, for example, a screwdriver which is inserted between the nut body 1 and the clamping ring 5, or by means of a special pair of pliers as will be later described.

Since the parts 3 and 5 only have to be slightly conical, the position of the tightened clamping ring 5 remains fixed by a self-locking effect. In order to prevent the clamping ring 5 absolutely from loosening, for example, by vibrations, the inner conical surface thereof and the outer surfaces 4 of segments 3 may be provided with transverse grooves or serrations.

Figure 3:
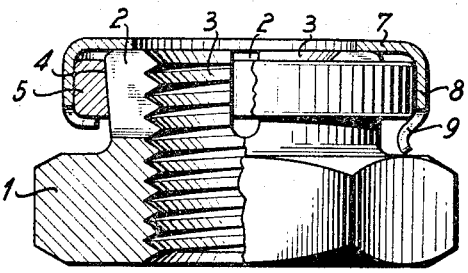
FIGURE 3 shows a side view, partly in section, of a modification of the locknut according to FIGURE 1.

Furthermore, it is possible to provide the clamping ring 5 with additional locking means for securing it in its tightened position, for example, in the form of an annular locking cap 7, as illustrated in FIGURE 3. This cap 7 is provided with a downwardly bent rim 8 which surrounds the clamping ring 5 and projects below the same. This projecting part of rim 8 may be bent inwardly toward the nut body 1 or at a few points it may be pressed inwardly. It is, however, also possible to provide this rim 8 at a few points with tabs 9 which are likewise bent inwardly after the clamping ring 5 has been tightened. This locking cap 7 thus prevents the clamping rings from loosening from its locking position.

Figure 3A:
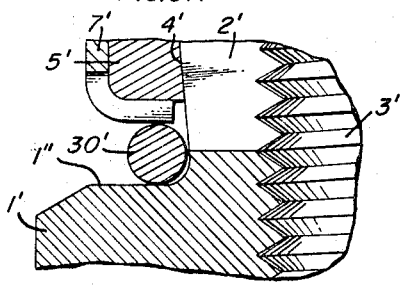
FIGURE 3A is a cross-sectional view of the device shown in FIGURE 3 but provided with an additional securing member for the clamping ring.

As shown in FIGURE 3A, the annular gap formed by the outwardly extending surface portion 1″ of the nut body 1′ and the clamping ring 5′ receives a wire member 30′ which is wrapped around the neck segments 2′, thus providing securing means additional to the cap 7′, of which a fragmentary portion is seen. The various elements 1, 2, 3, 4, 5 and 7 of FIGURE 3 find their counter parts in FIGURE 3A wherein they are designated by corresponding reference numerals which however bear appropriate prime marks. Additionally, the outwardly extending surface portion of nut body 1′ has been designated by the reference numeral 1″, and the member 30″ corresponds to the wire 30′ as shown in FIGURE 4.

According to the modification of the invention as illustrated in FIGURE 4, the relatively solid locking ring 5 is replaced by an annular conical locking strap 10 of sheet metal which is fitted in the same manner as locking ring 5 over the conical segments 3. In order to shift this thin clamping ring 10 in the axial direction of the locknut, it is provided with several diametrically opposite bores 11 into which the prongs of a special pair of pliers may be inserted. For securing the clamping ring 10 in the tightened position, it is provided with several tabs 12 which project beyond the segments 3 and may be bent inwardly over the outer end surface of the segments after they have been tightened. This absolutely prevents the clamping ring from loosening on the segments 3. Either of the clamping elements according to FIGURES 1 to 4 may also be very simply secured in the tightened position and prevented from loosening by filling out the gap between it and the nut body 1 by a wire 30 of the proper thickness as indicated in FIGURE 4 which is bent around the segments 3 or by a spring ring which is open at one side. An example of the foregoing adaptation is shown in FIGURE 3A, previously discussed.

FIGURES 5 and 6 show a further modification of the invention, in which for radially compressing the segments 3 a sheet metal strap 13 similar to a hose clamp is layed around or fitted over the outer surfaces 4 of segments 3 and then forms a ring which is open at one side. The inner annular surface of this clamp and the outer surfaces of the segments may be either cylindrical or tapering toward the outer end, as shown in FIGURE 5. For preventing this clamp 13 from slipping off the segments 3 it is advisable to provide the segments with a bead 16 on their outer end. The opposite ends of clamp 13 are bent over backward and these bent portions and their outer edges 14 are tapered. A wedge-shaped slide member 15 with inwardly bent arms is slipped from above in FIGURE 5 over these outer ends 14 of clamp 13 and when pushed downwardly, it will draw the ends 14 together and thereby tighten the clamp and compress the segments 3. For securing the slide member 15 in its tightening position on clamp 13 so that it cannot loosen the clamp may have a tab 17 projecting upwardly therefrom, as shown in FIGURE 5, which may be bent over the slide member 15 after it has been tightened or, vice versa, the edge of slide member 15 facing the nut body 1 may be provided with a projecting tab which may be bent over clamp 13 after it has been tightened. In place of such a wedge-shaped slide member, it is, of course, also possible to employ a normal hose clamp, in which case the ends 14 are bent outwardly and may be tightened by means of a screw.

According to the further modification of the invention as illustrated in FIGURES 7 and 8, the clamping element is made in the form of a wire ring 18 which may be either open on one side or consist of two half rings. This wire ring 18 is inserted into a peripheral groove 21 on segments 3 and may be tightened by means of a U-shaped stirrup 20 when the latter is pivoted from one position to another. If ring 18 consists of two separate halves, both ends of stirrup 20 are preferably provided with elongated, substantially oval holes 22 extending transversely to the direction of the stirrup itself, and the two wire ends 19 on each side of the ring are passed through these elongated holes 22 and are bent over in opposite directions on the outside of the stirrup. When stirrup 20 is pivoted to an upright position as shown in FIGURE 7, the parts of the two adjacent wire ends 19 which are passing through the elongated hole in one end of stirrup 20 are located in the opposite ends of this hole so that the two wire ends 19 are released, permitting the ring 18 to expand to its maximum diameter. When stirrup 20 is then pivoted about an angle of about 90° to its prone position in which it engages with the nut body 1, as shown in FIGURE 8, the elongated holes 22 are likewise turned so that the parts of the wire ring passing through each hole 22 are drawn together by the edges of the hole until they are located in the narrowest part of the hole. Ring 18 is thus contracted on each side to the extent of the difference in the distances between the maximum length and the minimum width of each hole 22 and thus exerts a strong clamping action upon segments 3.

If ring 18 is merely divided at one side so that only two adjacent wire ends are to be drawn together or released, only one end of stirrup 20 has an elongated hole 22, while the other end has a simple bore into which a pivot pin is inserted which is formed on ring 18 at a point diametrically opposite to the open end by bending the wire outwardly and back again at this point.

The nut body 1 is preferably provided with an annular groove 23 to receive the handle part of stirrup 20 when it is pivoted to its tightening position. As shown in FIGURE 8, this handle part of stirrup 20 is preferably laterally offset relative to its pivot axis extending through the center holes 22 so that when the stirrup is pivoted upright, it will not interfere with a bolt projecting from nut 1.

Figure 9:
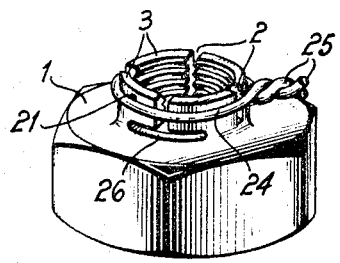
FIGURE 9 shows a perspective view of a locknut with a clamping wire.
Figure 10:
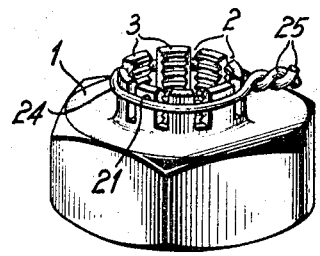
FIGURE 10 shows a perspective view of a modification of a locknut with a clamping wire.

For a smaller locknut of a more simple construction, it is possible to provide the clamping ring in the form of a wire 24, as shown in FIGURES 9 and 10, which is likewise placed into a peripheral groove 21 in the outer surface of segments 3 and the ends 25 of which are twisted together to tighten the segments to compress them on the bolt. In order to facilitate the operation of compressing the segments 3 in this manner they may be made more resilient by providing the neck portion of the locknut at the base of segments 3 with additional transverse slots 26 in the manner as shown in FIGURE 9 or by increasing the number of segments 3, as shown in FIGURE 10, that is, by reducing the width of each individual segment.

Figure 11:
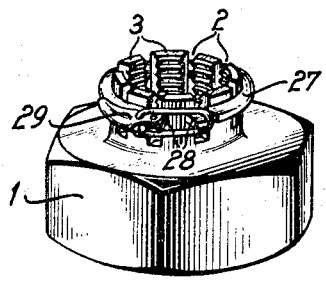
FIGURE 11 shows a perspective view of a locknut with an open clamping ring and a lever lock for tightening the ring.

According to the further modification of the invention, as shown in FIGURE 11, the clamping element consists of a ring 27 which is open at one side and is also inserted into the annular groove 21 in the outer surface of segments 3. The two ends 28 of this ring 27 project outwardly and may be drawn toward each other so as to tighten the ring by a lever lock 29 of a conventional type. Thus, similarly as according to FIGURES 7 and 8, the operation of tightening or releasing the clamping element and thus the segments 3 of the locknut may be carried out manually without requiring any tool.

Figure 12:
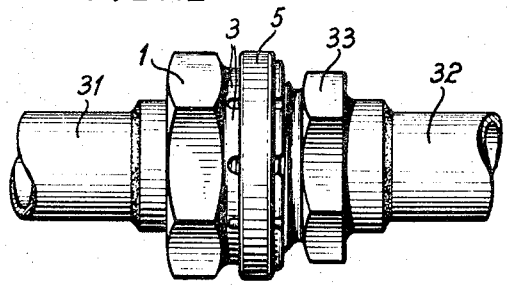
FIGURE 12 shows a side view of a pipe connection with a locknut according to FIGURE 1.
Figure 13:
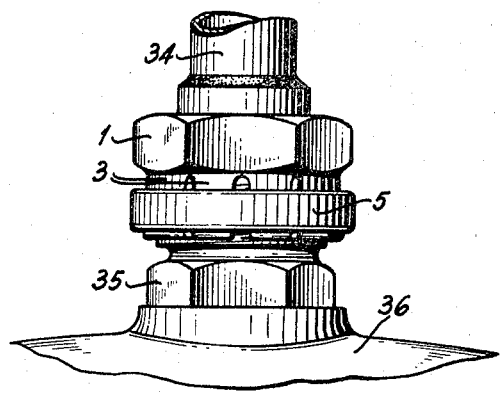
FIGURE 13 shows a side view of a tank connection with a locknut according to FIGURE 1.
Figure 14:
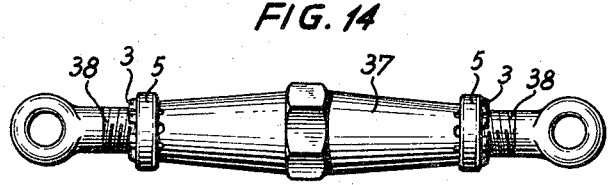
FIGURE 14 shows an elevation of a turnbuckle with locknuts according to FIGURE 1.

FIGURES 12 to 14 merely illustrate a few examples of the infinite number of cases in which the locknuts according to the invention may be employed, and it is to be understood that in any of these cases different embodiments of the invention as previously described or as may otherwise fall within the scope of the appended claims may be alternatively employed and that the particular embodiment which should be employed in any specific case depends primarily upon the required size of the locknut, the locking strength which should be attained, and upon the question whether the locknut should be easily removable or permanently secured to the bolt, pipe, or the like. The locknuts according to the invention may also be easily modified for use for particular purposes, for example, as cap nuts, adjusting nuts, as integral parts of machine elements, etc.

FIGURE 12 shows a pipe connection in which one pipe end 31 carries a locknut 1 in the form of a coupling nut which is screwed upon a male connecting piece 33 which is welded to another pipe end 32. The locking action is attained in the manner as previously described, for example, by radially compressing the segments 3 by shifting the clamping ring 5 in the axial direction.

FIGURE 13 illustrates the connection of a pipe end 34 to a tank 36 by means of a locknut 1 which is screwed upon a threaded pipe connection 35 which is welded to the tank. The tightening and locking of locknut 1 is carried out in the same manner as in FIGURE 12.

In FIGURE 14, the two ends of a turnbuckle 37 are designed in the form of locknuts with segments 3 on each end and with internal right and left-hand threads, respectively, into which eye bolts 38 are screwed. The tightening and locking functions are carried out also in this case by clamping elements 5 in the same manner as previously described.

Figure 15:
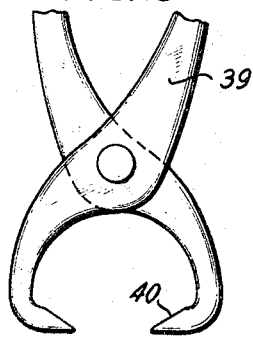
Figure 16:
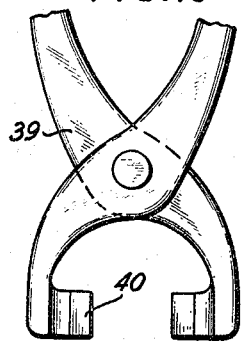
FIGURE 16 shows a plan view of a modification of the tightening pliers.

For shifting the clamping ring according to FIGURES 1 to 3 and 12 to 14 in the axial direction of the locknut, any suitable tool may be employed, for example, a pair of screwdrivers which are inserted at diametrically opposite points into the gap between the nut body 1 and the clamping ring or a special pair of pliers which may be designed, for example, as illustrated in FIGURES 15 and 16. Both of these pairs of pliers have wedge-shaped prongs 40 of such angularity that, when they are inserted into the mentioned gap and the pliers are then closed, these prongs will push the clamping ring upwardly of their inclined surfaces. The two pairs of pliers differ from each other merely by the direction of their inclined surfaces and the direction from which each pair is to be applied, those according to FIGURE 15 being intended for being applied over the clamping ring in an axial or oblique direction to the locknut and those according to FIGURE 16 being intended for being applied from one side of the locknut. The pliers which may be used for shifting a clamping ring of sheet metal, as shown, for example, in FIGURE 4, in the axial direction may in place of the wedge-shaped prongs be provided with small pins which may be inserted into opposite bores in the clamping ring. The pliers may then be used like a lever to push the clamping ring away from the nut body.

By means of such a simple tool it is possible to tighten a locknut according to the invention very quickly and securely. If it is to be doubly secured, it is thereafter only necessary to apply a locking cap, as shown in FIGURE 3 or to bend the locking tabs, as shown in FIGURE 4. If a locknut according to the invention is to be released, it is merely necessary to loosen the clamping ring from the segments by a light tap upon the ring, for example, by means of a hammer, whereby the ring slides back axially to its original position and the segments due to their resilience spread apart and are loosened from the bolt so that the locknut may then be easily unscrewed in the usual manner.

Having thus described my invention in detail, what I claim is:

1. A locknut having in combination a nut body and a neck portion thereon of a smaller diameter than said body, said nut body having an outwardly extending surface portion adjacent said neck portion, and further having a polygonal lateral surface to receive a wrench or the like for turning said nut to a desired rotative position, an internal screw thread extending continuously through said body and neck portion, said neck portion having radial slots therein dividing said neck portion into a plurality of arcuate, radially resilient segments and also having a smooth conical outer surface tapering toward said body, a clamping element including a closed ring of a smaller diameter than said polygonal surface and having a smooth conical inner surface tapering similar to said outer surface of said neck portion, said clamping ring being adjustably mounted on said neck portion for axial movement relative thereto from a non-clamping to a clamping position, said ring and said outwardly extending surface portion forming an annular gap adapted to receive a suitable tool at diametrically opposite points of said gap for forcing said clamping ring from said non-clamping to said clamping position for compressing said segments of said neck portion, annular securing means for securing said clamping ring in said clamping position, said securing means opposing movement of said clamping ring from said clamping position and including an annular element at least partly embracing said neck portion and provided with upwardly facing portions disposed in said gap, and a cap adapted to be placed over said clamping ring and said segments so as to substantially cover the same and having means extending in the axial direction and adapted at least partly to surround said clamping ring, said extending means having projection means adapted to project beyond said ring toward said body inwardly into said gap upon assumption by said clamping ring of said clamping position, said upwardly facing portions being comprised in said projection means.

2. A locknut having in combination a nut body and a neck portion thereon of a smaller diameter than said body, said body having an outwardly extending surface portion adjacent said neck portion, and further having a polygonal lateral surface to receive a wrench or the like for turning said nut to a desired rotative position, an internal screw thread extending continuously through said body and neck portion, said neck portion having radial slots therein dividing said neck portion into a plurality of arcuate, radially resilient segments and also having a smooth conical outer surface tapering toward said body, a closed clamping ring of a smaller diameter than said polygonal surface and having a smooth conical inner surface tapering similar to said outer surface of said neck portion, the taper of said smooth conical outer and inner surfaces being such that the diameters thereof progressively increase in an axial direction away from said outwardly extending surface, said clamping ring being shorter than said neck portion in the axial direction and being adjustably mounted on said neck portion for axial movement relative thereto from a non-clamping to a clamping position, said clamping ring and said outwardly extending surface portion forming an annular gap adapted to receive a suitable tool at diametrically opposite points of said gap for axially broadening said gap and thereby forcing said clamping ring from said non-clamping to said clamping position so as to compress the segments of said neck portion, securing means for securing said clamping ring in said clamped position, said securing means comprising an element at least partly embracing said neck portion and of a material possessing substantial rigidity against changes in its cross-sectional dimensions corresponding to the axial direction so as to be capable of producing a counter force sufficient to retain said clamping ring in said clamped position, and said last-mentioned element having such a dimension and configuration in the axial direction as to be insertable into said gap substantially only if axially broadened with said clamping ring in said clamping position and to provide a form-locking securing of the lock nut by opposing axial movement of said clamping ring from said clamped position.

3. A locknut as defined in claim 2, in which said element of the annular securing means is of circular cross-section.

4. A locknut as defined in claim 2, in which said element of the annular securing means consists of a spring ring having an opening at one side.

5. A locknut as defined in claim 2, in which said element of the annular securing means consists of a wire wrapped around said neck portion.

6. A locknut having in combination a nut body and neck portion thereon of a smaller diameter than said body, said nut body having an outwardly extending surface portion adjacent said neck portion, and further having a polygonal lateral surface to receive a wrench or the like for turning said nut to a desired rotative position, an internal screw thread extending continuously through said body and neck portion, said neck portion having radial slots therein dividing said neck portion into a plurality of arcuate, radially resilient segments and also having a smooth conical outer surface tapering toward said body, a clamping element comprising a closed ring of a smaller diameter than said polygonal surface and having a smooth conical inner surface tapering similar to said outer surface of said neck portion, said clamping element being shorter than said neck portion in the axial direction and being adjustably mounted on said neck portion for axial movement relative thereto from and to a clamping position wherein the upper portions of said segments are bent radially inward and wherein said ring and said outwardly extending surface portion form an annular gap, said gap being axially broadened by moving said clamping ring from said non-clamping to said clamping position, a securing element of substantially rigid and incompressible material for securing said clamping ring in said clamped position, said securing element at least partly embracing said neck portion, and having a thickness so as to be insertable into said gap only if axially broadened with said clamping element in said clamped position and to rigidly fill out said gap at least over portions thereof in order to form-lockingly secure said lock nut in the clamped position by opposing axial movement of said clamping ring from said clamped position.

7. A locknut according to claim 6, wherein the conical surfaces of said neck portion and of said clamping ring taper in such a manner that the radial dimensions thereof decrease in a direction from the end of the neck portion toward said nut body.

8. A locknut having in combination a nut body and a neck portion thereon of a smaller diameter than said body, said body having an outwardly extending surface portion adjacent said neck portion, and further having a polygonal lateral surface to receive a wrench or the like for turning said nut to a desired rotative position, an internal screw thread extending continuously through said body and neck portion, said neck portion having radial slots therein dividing said neck portion into a plurality of arcuate, radially resilient segments and also having a smooth conical outer surface tapering toward said body, a closed clamping ring of a smaller diameter than said polygonal surface and having a smooth conical inner surface tapering similar to said outer surface of said neck portion, said clamping ring being shorter than said neck portion in the axial direction and being adjustably mounted on said neck portion for axial movement relative thereto from a non-clamping to a clamping position, said clamping ring and said outwardly extending surface portion forming an annular gap adapted to receive a suitable tool at diametrically opposite points of said gap for axially broadening said gap and thereby forcing said clamping ring from said non-clamping to said clamping position so as to compress the segments of said neck portion, annular securing means for securing said clamping ring in said clamped position, said securing means comprising an element of substantially rigid and incompressible material at least partly embracing said neck portion and bridging said gap in the axial direction with said clamping ring in the clamping position, and said last-mentioned element having a dimension in the axial direction such as to be insertable into said gap only if axially broadened with said clamping ring in said clamping position and to provide a form-locking securing of the locknut by opposing axial movement of said clamping ring from said clamped position.

9. A locknut according to claim 8, wherein the element of said securing means is annular.

10. A locknut according to claim 8, of which the conical surfaces of said neck portion and of said clamping ring taper in such a manner that the radial dimensions thereof decrease in a direction from the end of the neck portion toward said nut body.

References Cited

UNITED STATES PATENTS

| | | | |
|---|---|---|---|
| 1,376,296 | 4/1921 | Snow | 151—19 |
| 1,389,927 | 9/1921 | Ball | 151—21 |
| 2,402,583 | 6/1946 | Schumacher | 151—19 |
| 439,660 | 11/1890 | Holmquist | 151—21 |
| 722,751 | 3/1903 | Rathmell | 85—33 |
| 750,675 | 1/1904 | Michelin | 85—33 |
| 1,790,111 | 1/1931 | Pike | 285—322 |
| 2,226,914 | 12/1940 | Sharon | 285—34 |
| 2,367,480 | 1/1945 | Biswick | 85—33 |
| 2,406,070 | 8/1946 | Funk | 151—14 |

FOREIGN PATENTS

| | | |
|---|---|---|
| 237,809 | 8/1925 | Great Britain. |
| 1,003,909 | 11/1951 | France. |
| 547,624 | 9/1942 | Great Britain. |
| 594,031 | 10/1947 | Great Britain. |

EDWARD C. ALLEN, *Primary Examiner.*

CARL W. TOMLIN, *Examiner.*

R. S. BRITTS, *Assistant Examiner.*